United States Patent
Gatto et al.

(10) Patent No.: US 11,132,571 B2
(45) Date of Patent: Sep. 28, 2021

(54) SYSTEM, METHOD AND COMPUTER PROGRAM FOR GUIDED IMAGE CAPTURING OF A MEAL

(71) Applicant: Sony Corporation, Tokyo (JP)

(72) Inventors: Alexander Gatto, Stuttgart (DE); Piergiorgio Sartor, Stuttgart (DE); Ralf Müller, Stuttgart (DE); Mori Hironori, Stuttgart (DE); Oliver Erdler, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 16/485,452

(22) PCT Filed: Feb. 28, 2018

(86) PCT No.: PCT/EP2018/054927
§ 371 (c)(1),
(2) Date: Aug. 13, 2019

(87) PCT Pub. No.: WO2018/162296
PCT Pub. Date: Sep. 13, 2018

(65) Prior Publication Data
US 2020/0042816 A1    Feb. 6, 2020

(30) Foreign Application Priority Data
Mar. 7, 2017   (EP) .................... 17159719

(51) Int. Cl.
*G06K 9/00*    (2006.01)
*G06K 9/20*    (2006.01)
*H04N 5/232*   (2006.01)
*G06N 20/00*   (2019.01)

(52) U.S. Cl.
CPC ....... *G06K 9/2018* (2013.01); *G06K 9/00201* (2013.01); *H04N 5/23222* (2013.01); *H04N 5/23299* (2018.08); *G06K 2209/17* (2013.01); *G06N 20/00* (2019.01)

(58) Field of Classification Search
CPC ............ G06K 9/2018; G06K 9/00201; G06K 2209/17; H04N 5/23299; H04N 5/23222; G06N 20/00
See application file for complete search history.

(56) References Cited

U.S. PATENT DOCUMENTS

2009/0162042 A1    6/2009  Wexler et al.
2011/0243392 A1*  10/2011  Miyahara ............... G16H 20/30
                                                382/110
2014/0185046 A1*   7/2014  Urushidani .......... G01N 21/359
                                                356/402

(Continued)

FOREIGN PATENT DOCUMENTS

WO    2013/085512 A1    6/2013
WO    2016/081831 A1    5/2016

OTHER PUBLICATIONS

International Search Report and Written Opinion dated on May 17, 2018 for PCT/EP2018/054927 filed on Feb. 28, 2018, 9 pages.

*Primary Examiner* — Aaron W Carter
(74) *Attorney, Agent, or Firm* — Xsensus LLP

(57) ABSTRACT

A system including circuitry configured to process multi-spectral image data of a meal to obtain information on the contents of the meal; and generate, based on the obtained information, a query with guidance to change image capture settings.

17 Claims, 20 Drawing Sheets

(56) References Cited

U.S. PATENT DOCUMENTS

| | | | |
|---|---|---|---|
| 2014/0267684 A1* | 9/2014 | Nelson | G01N 21/94 |
| | | | 348/89 |
| 2014/0368639 A1 | 12/2014 | Wu et al. | |
| 2015/0168365 A1 | 6/2015 | Connor | |
| 2015/0228062 A1 | 8/2015 | Joshi et al. | |
| 2015/0302160 A1* | 10/2015 | Muthukumar | G16H 20/30 |
| | | | 600/301 |
| 2016/0063692 A1 | 3/2016 | Divakaran et al. | |
| 2018/0149519 A1* | 5/2018 | Connor | G01J 3/0256 |
| 2018/0172510 A1* | 6/2018 | Rosen | G01J 3/0256 |
| 2018/0365822 A1* | 12/2018 | Nipe | G06K 9/42 |
| 2019/0011383 A1* | 1/2019 | Cohen | G01N 33/03 |
| 2019/0277757 A1* | 9/2019 | Frielinghaus | B01F 15/00207 |
| 2019/0311230 A1* | 10/2019 | Mahapatra | G06F 16/5838 |
| 2019/0391161 A1* | 12/2019 | Hill | G01N 30/7233 |
| 2020/0042816 A1* | 2/2020 | Gatto | G06K 9/00201 |
| 2020/0042817 A1* | 2/2020 | Gatto | G01N 21/31 |
| 2020/0152312 A1* | 5/2020 | Connor | G06K 9/00335 |
| 2020/0303054 A1* | 9/2020 | Park | G01N 33/02 |
| 2020/0342977 A1* | 10/2020 | Son | G06Q 30/02 |

* cited by examiner

A multispectral image may be obtained by a multispectral imaging device such as a multispectral camera. Spectral

SYSTEM, METHOD AND COMPUTER PROGRAM FOR GUIDED IMAGE CAPTURING OF A MEAL

CROSS-REFERENCE TO RELATED APPLICATIONS

The present application is based on PCT filing PCT/EP2018/054927, filed Feb. 28, 2018, which claims priority to EP 17159719.8, filed Mar. 7, 2017, the entire contents of each are incorporated herein by reference.

FIELD OF DISCLOSURE

The present disclosure relates to the field of computer vision, in particular to systems, methods and computer programs for identification of food.

BACKGROUND

In computer vision, mathematical techniques are used to detect the presence of and recognize various items that are depicted in digital images. Computer vision tasks include methods for acquiring, processing, analyzing and understanding digital images, and in general, deal with the extraction of high-dimensional data from the real world in order to produce numerical or symbolic information, e.g., in the forms of decisions. Localized portions of an image, on which specific types of computations are performed to produce visual features, may be used to analyze and classify objects depicted in the image. Low-level features, such as interest points and edges, edge distributions, color distributions, shapes and shape distributions, may be computed from portions of an image and used to detect items that are depicted in the image. Machine learning algorithms can be used for feature recognition.

Accurate identification of food being consumed is an important task to for example people who suffer from food-born allergies, who participate in weight-loss programs, and who just enjoy eating and trying new foods.

SUMMARY

According to a first aspect, a system is provided including circuitry configured to process multispectral image data of a meal to obtain information on the contents of the meal; and generate, based on the obtained information, a query with guidance to change image capture settings.

According to a second aspect, a method is provided including processing multispectral image data of a meal to obtain information on the contents of the meal; and generating, based on the obtained information, a query with guidance to change image capture settings.

According to a third aspect, a computer program is provided including instructions, the instructions when executed on a processor causing the processor to perform: processing multispectral image data of a meal to obtain information on the contents of the meal; and generating, based on the obtained information, a query with guidance to change image capture settings.

Further aspects of the disclosure are set forth in the dependent claims, the following description and the drawings.

BRIEF DESCRIPTION OF THE DRAWINGS

Embodiments of the present disclosure are explained by way of example with respect to the accompanying drawings, in which:

FIG. 17b illustrates a second measurement for obtaining a reflectance spectrum, wherein the light source of the mobile reflectometer is switched on.

DETAILED DESCRIPTION OF EMBODIMENTS

Figure 1:
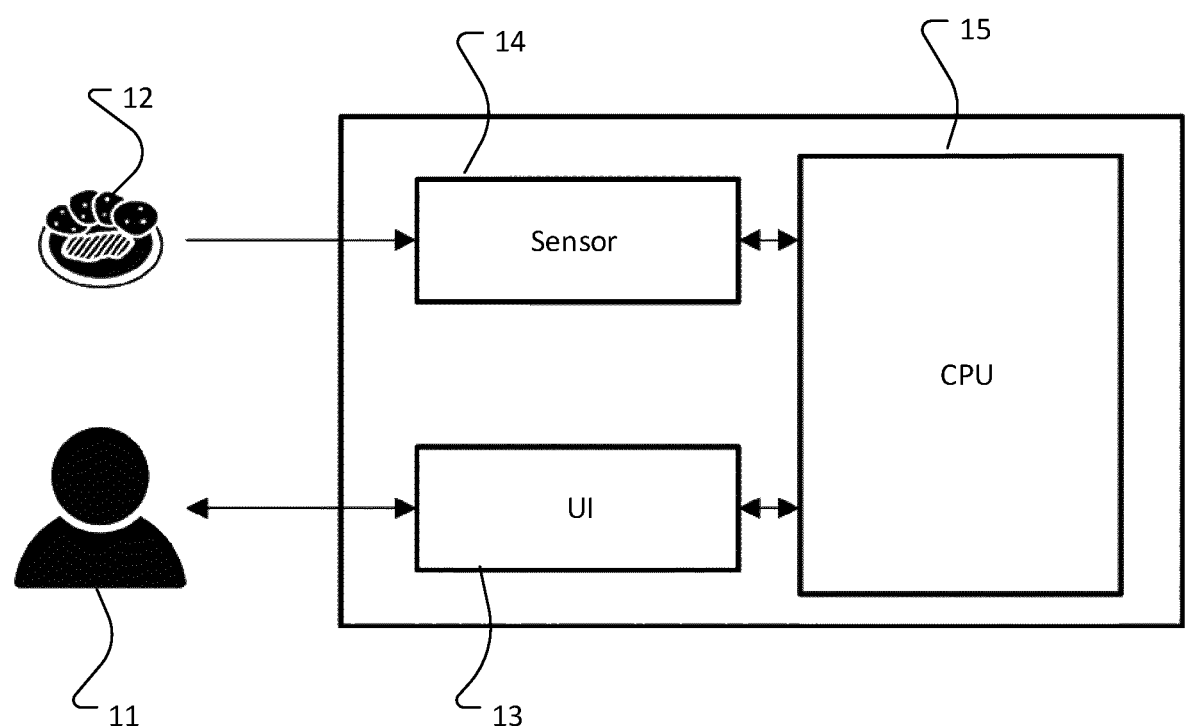
FIG. 1 schematically describes a system for recipe generation.

The embodiments described below provide a system including circuitry configured to process multispectral image data of a meal to obtain information on the contents of the meal; and generate, based on the obtained information, a query with guidance to change image capture settings.

The system may for example include mobile devices, smartphones, tablets, smartwatches, glasses or other kinds of wearable devices. The system may also include any such devices in cooperation with a server or cloud processing and/or storage system. Still further, the system may also include a client device and a remote device, e.g. a server device, that are connected via a network such as the Internet or a LAN.

The circuitry may for example be implemented by a processor, e.g. a central processing unit (CPU) or the like. The processor may be located on a mobile device, a remote workstation or a cloud server. The circuitry may also be distributed circuitry that is distributed over a mobile device, a remote workstation, and/or a cloud server.

A multispectral image may be obtained by a multispectral imaging device such as a multispectral camera. Spectral imaging may be a combination of imaging and spectroscopy, where a spectrum is collected at every location of an image plane. Multispectral imaging may comprise retrieving for each pixel multiple measurements, each measurement relating to a specific frequency in the frequency spectrum. Multispectral imaging is not restricted to visible light, but works also in ultraviolet and in infrared. A multispectral camera may for example capture measurements in the visible color channel from 400-700 nm and a near infrared (NIR) channel from 750-900+ nm. Multispectral imaging may also include hyperspectral imaging.

Analyzing multispectral image data of a meal to obtain information on the contents of the meal may include executing one or more feature detection algorithms, including machine learning algorithms, semantic reasoning techniques, similarity algorithms, and/or other technologies to, among other things, in an automated feature detection, recognize and describe one or more food items that are depicted in a digital image. Some examples of feature detection algorithms that may be used for analyzing multispectral image data include a histogram of oriented gradients (HoG), an edge orientation histogram, a scale-invariant feature transform descriptor (SIFT), and a shape context technique.

Image capture settings may be anything that has influence on what information a sensor arrangement such as a multispectral camera is capturing. Image capture settings may for example include a position and/or an orientation of a camera, e.g. angles (shooting angle) of a camera such as roll, yaw and pitch. Image capture settings may also include the distance between a meal and a camera. Still further, image capture settings may also include aspects such as separating an ingredient of a meal from the other ingredients, or placing a specific ingredient of a meal closer to a camera.

Generating a query with guidance for asking a user to change image capture settings may for example be implemented by a user interface. The user interface may be associated with visual feedback on a mobile device or may involve voice feedback via a mobile device.

The circuitry may be configured to generate the query with guidance according to insufficient information on the contents of the meal. For example, at each step, feedback can be received from a user to achieve more precise information.

The circuitry may be configured to guide the user to change the attitude of a camera (e.g. a shooting angle of a camera) to point to other ingredients of the meal.

The circuitry may also be configured to guide the user to pick up at least a part of the meal. This may allow to clearly show the part of the meal to a camera.

The circuitry may be also configured to guide the user to cut the meal into parts and show a surface profile of the meal towards a camera.

The circuitry may be also configured to guide the user to move a camera and to see a particular object in the meal close up.

The circuitry may be configured to generate a recipe of the meal based on the obtained information on the contents of the meal. This may for example be done by comparing and matching the meal contents of an identified meal with those of meals on an existing recipe database, or more sophisticatedly by full automatic recipe generation process.

The recipe may for example include ingredients information, nutrition information, and/or allergen information, as well as cooking instructions.

The circuitry may for example be configured to calculate calories and recommend changes to the generated recipe based on the user's health or diet plan.

The circuitry may be configured to change the recipe generation process based on feedback, This may allow to improve the precision of recipe generation based on feedback received by the user.

The system may include a sensor arrangement configured to collect multispectral image data of a meal. This sensor arrangement may for example be located on a mobile device such as smart phone, tablet, or wearable devices.

The sensor arrangement may be configured to provide depth information. The sensor arrangement may for example apply stereoscopic imaging, Time-of-Flight imaging (ToF) or other techniques for providing depth information. Accordingly, the circuitry may be configured to use depth information for volume analysis of a whole meal or each ingredient of the meal to determine the quantity of the ingredients for recipes. Depth information may also be helpful to computer vision techniques such as histogram of oriented gradients (HoG), edge orientation histogram, scale-invariant feature transform descriptor (SIFT), and shape context to determined shapes.

The sensor arrangement may be configured to provide mass spectrography information. By utilizing mass spectroscopy data, the circuitry may achieve precise content determination. This may allow identifying various kinds of compounds including sugars, salts, oil, and biomolecules such as proteins. Recent developments in mass spectroscopy have shown that mass spectroscopy can be integrated into a compact equipment such as mobile phones. For example, the aero-thermo-dynamic mass analysis (AMA) described by Kota Shiba & Genki Yoshikawa in Scientific Reports 6, article number 28849 on nature.com can be integrated into various analytical devices, production lines, and consumer mobile platforms. Accordingly, such technology can be beneficially used for food recognition and recipe generation in the context of smart phones.

The sensor arrangement may be configured to provide visible images, infrared images, and/or spectral data.

The circuitry may be configured to employ ingredient segmentation on a multispectral image by distinguishing the difference of spectrum properties of ingredients.

The circuitry may be configured to identify ingredients by analyzing spectrum data.

The circuitry may be configured to use conventional image data (standard RGB image data) for course identification such as the meal name identification. This may help improving the efficiency of processing by narrowing down the candidate meal contents. Such conventional image data may for example be compared with reference image data stored in a reference image data base.

From meal content determination to recipe generation, the method may simply identify the name of a meal in front of a camera by utilizing machine learning and refer to existing recipe database based on identified meal name to extract the recipe of identified meal.

All above described aspects may also be realized as a method or computer program. The method, respectively the computer program may collect information of a prepared meal based on multispectral information, depth information and/or mass spectrography information using camera in addition to conventional visible images. The method identifies a meal, analyzes meal content, measures volume of ingredients, and generates a recipe, from collected data. The method may also calculate calories and recommend changes to the generated recipe based on the user's health or diet plan. The method can improve its precision of recipe generation based on the feedback received by the user.

The recipe generation can be fully automated with help of an intelligent identification system. The method can determine the way of cooking, duration of cooking, step of cooking, the volume of ingredients, the quantity of salt, sugar and oil based on measured data. The system may also calculate calories and recommend changes to the generated recipe based on a user's health or diet plan.

The embodiments described below disclose a method to identify a prepared food by taking a visual image, multispectral information, depth information and/or mass spectrography information using a camera. The measured data is analyzed to identify a meal and the ingredients of a meal. The proposed disclosure also provides a system including a bot agent that iteratively provides feedback associated with capturing the images to a user for precisely identifying a meal (for example, cut the meal into halves and take an image of an inside of the meal). The system generates a recipe upon identifying the meal. The system may also calculate calories and recommend changes to the generated recipe based on the user's health or diet plan.

FIG. 1 schematically describes an embodiment of a system for recipe generation. The system for recipe generation is composed of a sensor arrangement 14, a processor 15, and a user interface 13. The sensor arrangement 14, according to this example, is supposed to be on a mobile device such as a smart phone, a tablet or a wearable device. The processor 15 is also located on a mobile device. However, according to other embodiments, the processor 15 may also be located in part or as a whole on a remote workstation or cloud server. The user interface 13 may be associated with visual feedback, e.g. on a mobile device or the voice feedback via a mobile device.

Figure 2:
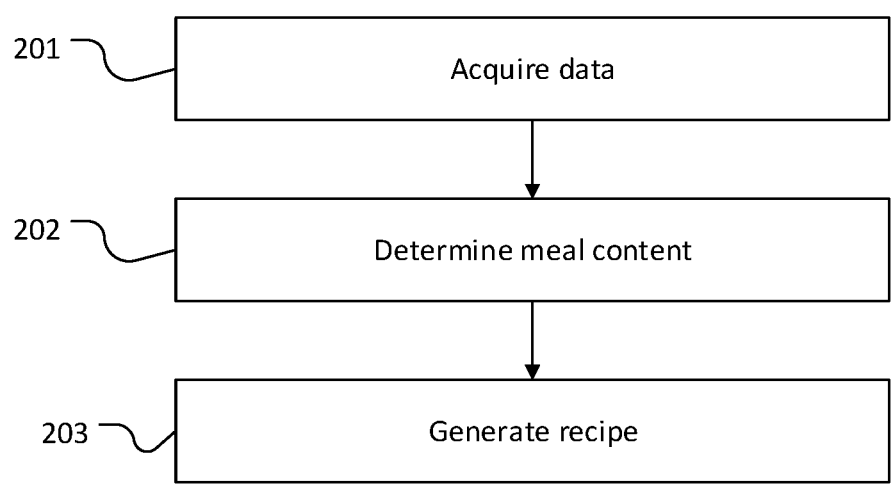
FIG. 2 describes an example of a recipe generation process.

FIG. 2 describes an example of a recipe generation process. At 201, data from a meal is acquired (e.g. by means of sensor arrangement 14 in FIG. 1). The data, according to this embodiment, is comprised of multispectral images captured by a multispectral sensor, but it can be various kinds of information associated with various devices, such as visible images, infrared images, spectral data and depth information. At 202, information about the meal, e.g. the meal content, is determined by analyzing measured data by utilizing computer vision techniques. For instance, based on given multispectral images, ingredient segmentation is employed by distinguishing the difference of spectrum properties of ingredients. Also, ingredients can be identified by analyzing spectrum data. Depth information may be used for volume analysis of a whole meal or each ingredient to determine the quantity of the ingredients for recipes. Mass spectroscopy data may be utilized to achieve precise content determination. This allows identifying various kinds of compounds including sugars, salts, oil, and biomolecules such as proteins. Conventional image data can be used for course identification such as the meal name identification. This may help improving the efficiency of processing by narrowing down the candidate meal contents.

Finally, at 203, a recipe of the meal is generated. This can be done by comparing and matching the meal content of an identified meal with those of meals on an existing recipe database, or more sophisticatedly, by a full automatic recipe generation process. From meal content determination to recipe generation, the method may for example identify the meal name by utilizing machine leaning and refer to an existing recipe database based on the identified meal name to retrieve the recipe of identified meal from the recipe database.

Figure 3:
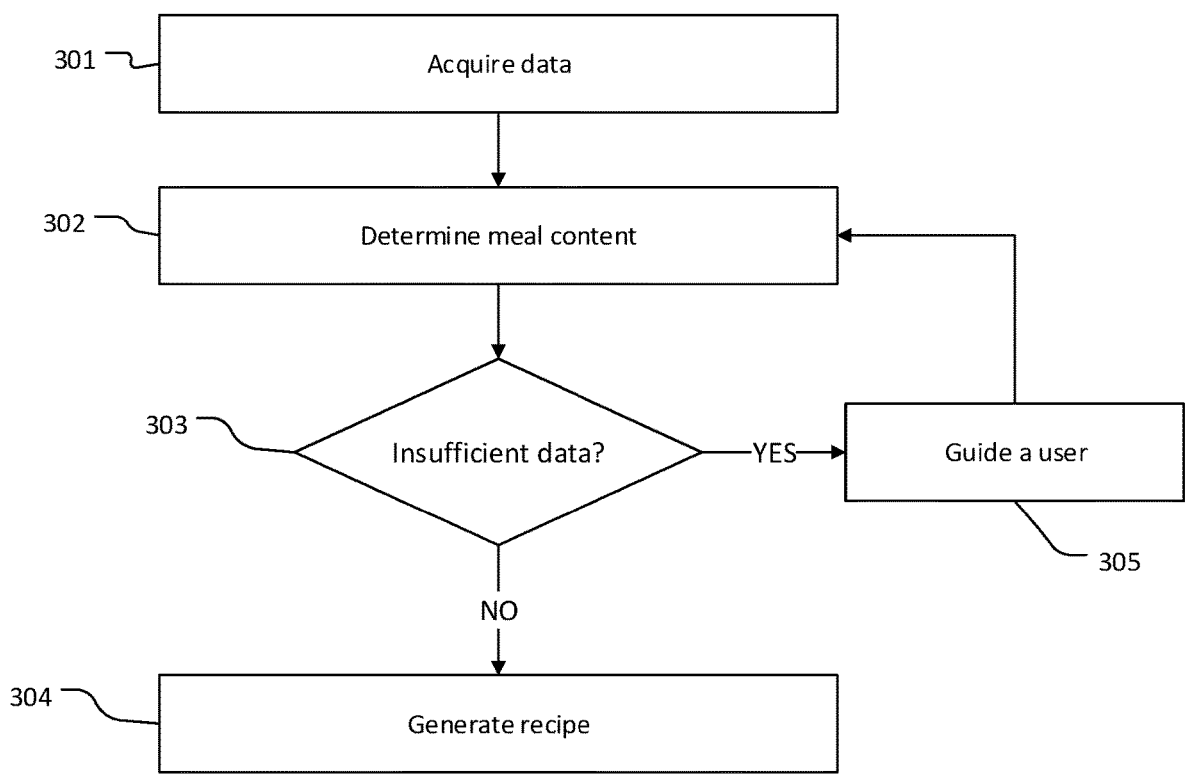
FIG. 3 shows an embodiment of a recipe generation process associated with user feedback.

FIG. 3 shows an embodiment of a recipe generation process associated with user feedback. As in the example of FIG. 2, at 301, data from a meal is acquired, e.g. by means of sensor arrangement 14 in FIG. 1. At 302, information about the meal, e.g. the meal content, is determined by analyzing measured data by utilizing computer vision techniques. At 303, it is determined if there is sufficient data for generating a recipe of the meal. If it is decided at 303 that there is sufficient data for generating a recipe of the meal, the process continues at 304. At 304, a recipe is generated for the meal based on the determined meal content. If it is decided at 303 that there is insufficient data for generating a recipe of the meal, the process continues at 305. At 305, the process generates a query to guide a user to provide more information on the meal. This process may be repeated iteratively until the whole meal content has been determined or until the identification of the meal can be performed. At each step, feedback can be received from a user to achieve more precise recipe generation. For example, if the process cannot decide the meal content since the available data is not sufficient, or the data includes some ambiguities, the system can iteratively guide a user to check the meal to identify the content precisely.

It should be noted that not necessarily the whole meal content must be determined to identify a meal. According to some embodiments, the content of a meal is identified up to a predetermined level at which an identification of the meal can be performed. If the meal can be fully identified based on only parts of its content, then a reference database may be queried to receive the remaining content of the meal that have not yet been identified. It also should be noted that the user may select a meal from the identified candidates displayed on a display of the mobile device. The selection may be used to update the database of the recipes and to improve the machine learning.

The guidance may be generated according to the insufficient data. Exemplifying relationship between insufficient data and respective guidance is given in the embodiments described below with reference to FIGS. 4 to 11.

Figure 4:
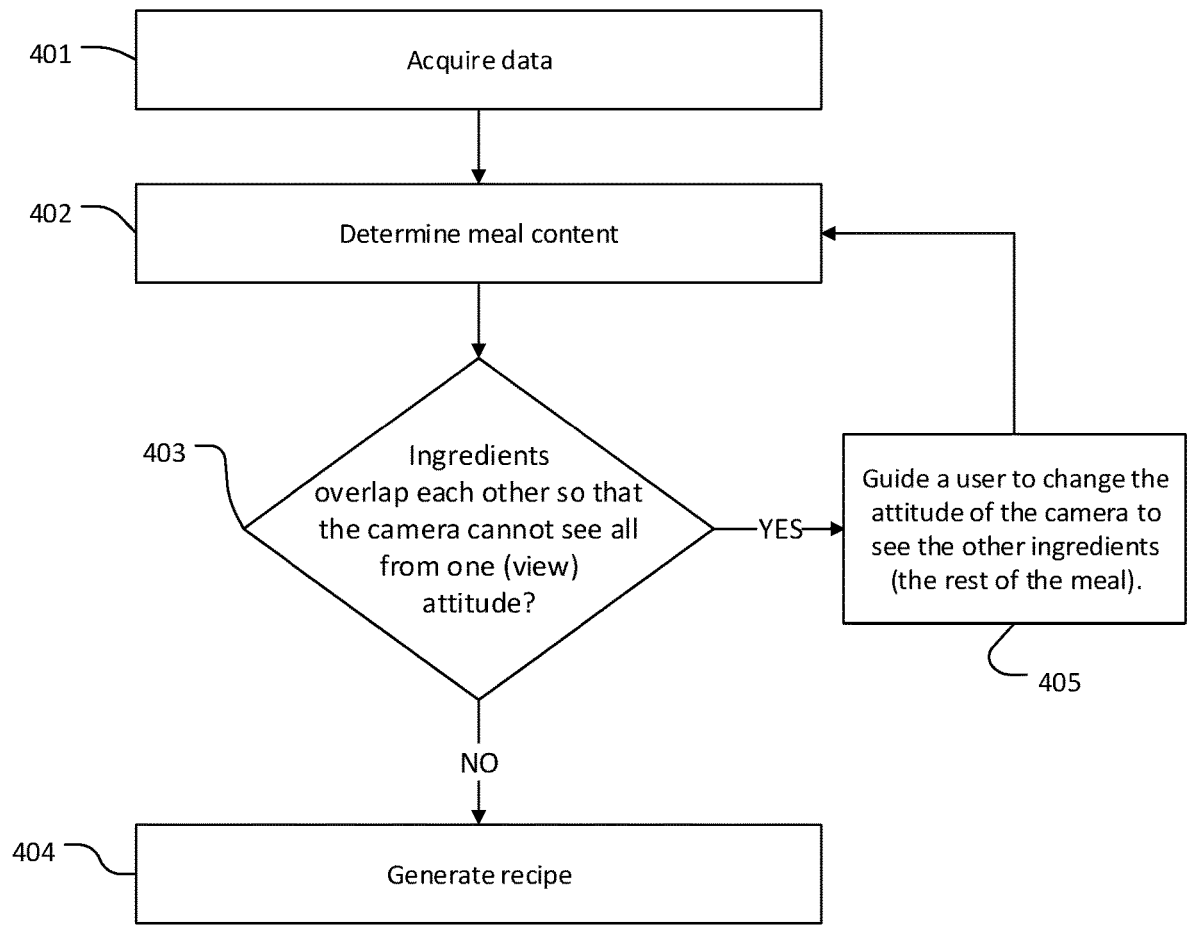
FIG. 4 shows a specific embodiment of a recipe generation process associated with user feedback.

FIG. 4 shows a specific embodiment of a recipe generation process associated with user feedback. At 401, data from a meal is acquired, e.g. by a multispectral camera that is integrated in a mobile phone. At 402, information about the meal, e.g. the meal content, is determined by analyzing measured data by utilizing computer vision techniques. At 403, it is determined if ingredients overlap each other so that the camera cannot see all from one view angle. If it is decided at 403 that ingredients do not overlap each other, the process continues at 404. At 404, a recipe is generated for the meal based on the determined meal content. If it is decided at 403 that ingredients overlap each other, the process continues at 405. At 405, the process generates a query to guide a user to change the attitude of the camera to see the other ingredients (the rest of the meal). Changing the attitude may for example comprise changing the position and/or orientation (shooting angle) of the camera. This process may be repeated iteratively until the whole meal content has been determined. This process may be particularly helpful if there is not enough spectral information available if the ingredients overlap each other. In particular, it may allow to analyze other ingredients of the meal.

Figure 5A:
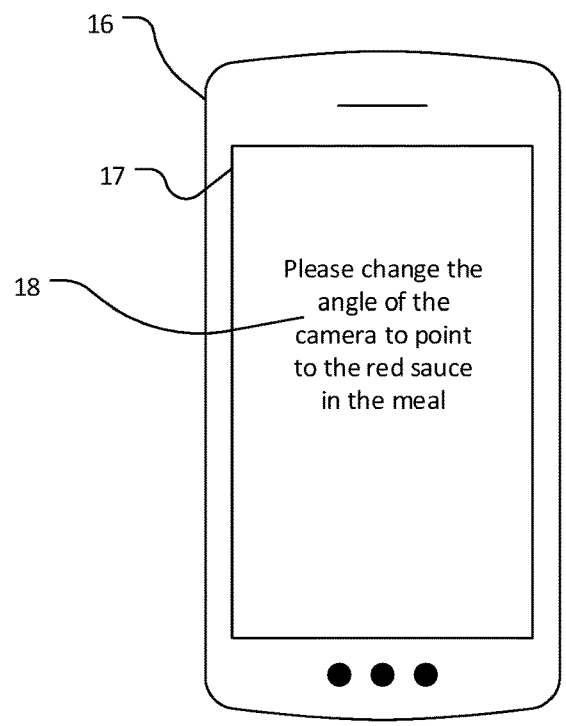
FIG. 5a shows an embodiment of a user query on a display of a mobile phone.

FIG. 5a shows an embodiment of a user query on a display of a mobile phone. The mobile phone 16 is equipped with a multispectral camera (e.g. on the back side of the device, thus not shown in FIG. 5) that is configured to analyze multispectral image data of a meal to obtain information on the contents of the meal. The mobile phone 16 includes a display screen 17 that acts as user interface. The display screen 17 shows a query 18 to guide a user to change the attitude of the camera to point to red sauce that has been identified within a meal. A user having read this query 18 can react by changing the attitude of the camera, e.g. the shooting angle of the camera (or the angle of the mobile phone) to point to the red sauce. The process can then repeat determining information about the meal by analyzing measured data, now based on the changed angle of the camera. This may reveal better information on the meal, e.g. more specific nutrition facts about the red sauce to which the camera is pointed may be obtained.

Figure 5B:
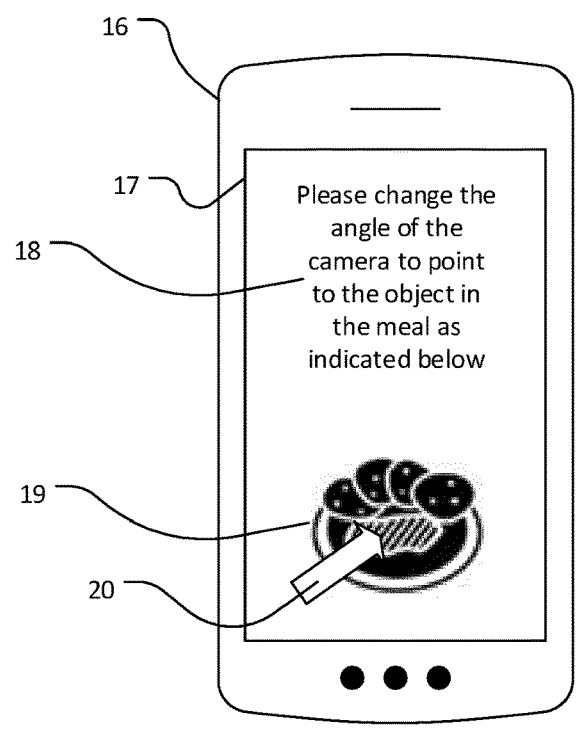
FIG. 5b shows an alternative embodiment of a user query on a display of a mobile phone.

FIG. 5b shows an alternative embodiment of a user query on a display of a mobile phone. According to this embodiment, the mobile phone 16 displays an image 19 of a meal as captured by the camera.

Further, the mobile phone 16 displays a query 18 that guides a user to change the attitude of the camera to point to the object in the meal as indicated by an arrow 20 on the image 19. A user having read this query 18 can react by changing the attitude of the camera, e.g. the shooting angle of the camera (or the angle of the mobile phone) to point to the object identified by the arrow 20. The process can then repeat determining information about the meal by analyzing measured data, now based on the changed angle of the camera.

Figure 6:
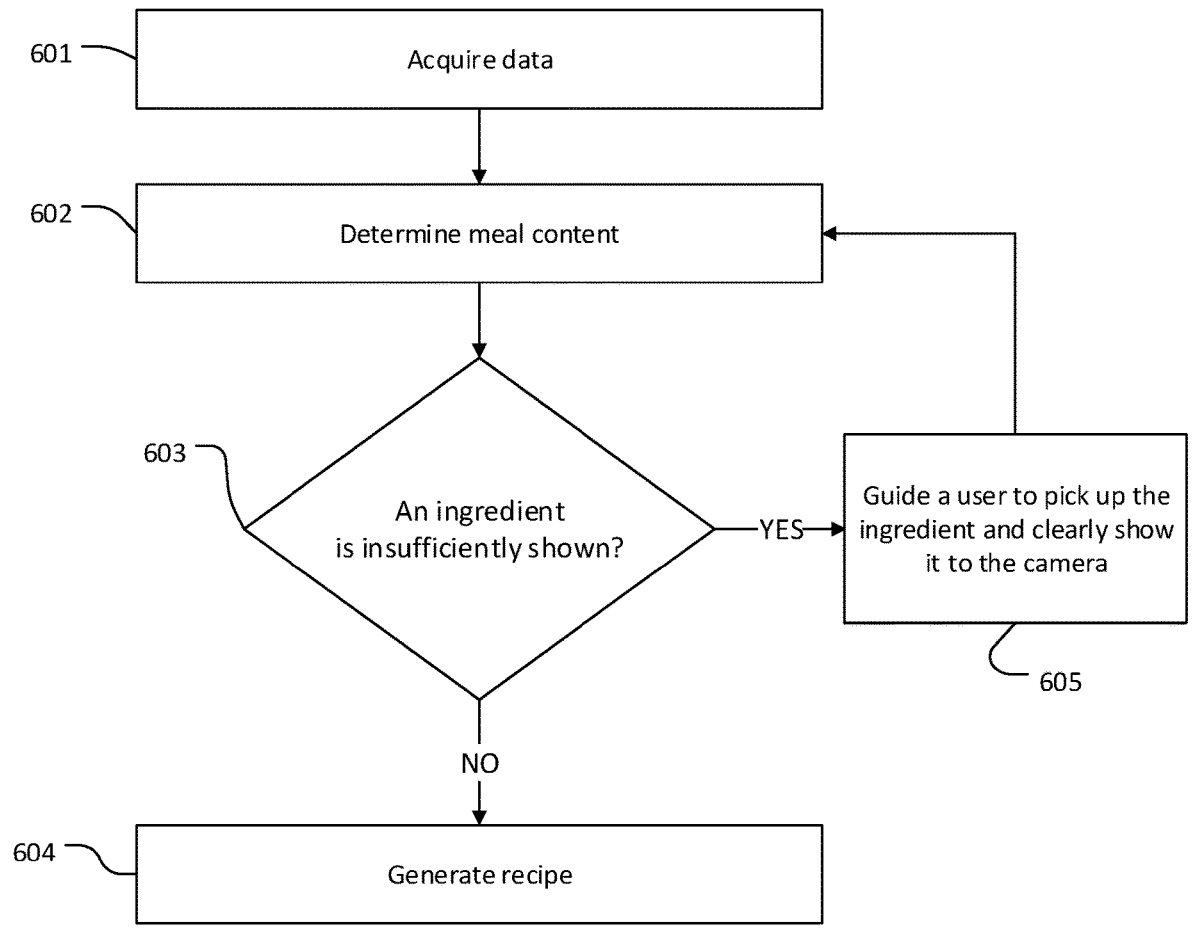
FIG. 6 shows a further specific embodiment of a recipe generation process associated with user feedback.

FIG. 6 shows a further specific embodiment of a recipe generation process associated with user feedback. At 601, data from a meal is acquired, e.g. by a multispectral camera that is integrated in a mobile phone. At 602, information about the meal, e.g. the meal content, is determined by analyzing measured data by utilizing computer vision techniques. At 603, it is determined if an ingredient is insufficiently shown (for instance, it being soaked in the soup). If it is decided at 603 that all ingredients are sufficiently shown, the process continues at 604. At 604, a recipe is generated for the meal based on the determined meal content. If it is decided at 603 that an ingredient is insufficiently shown, the process continues at 605. At 605, the process generates a query to guide a user to pick up the ingredient and clearly show it to the camera. This process may be repeated iteratively until the whole meal content has been determined. This process may be particularly helpful if there is not enough spectral information available if the ingredients are not clearly shown to the camera. In particular, it may allow to adequately acquire images or data of the meal.

Figure 7A:
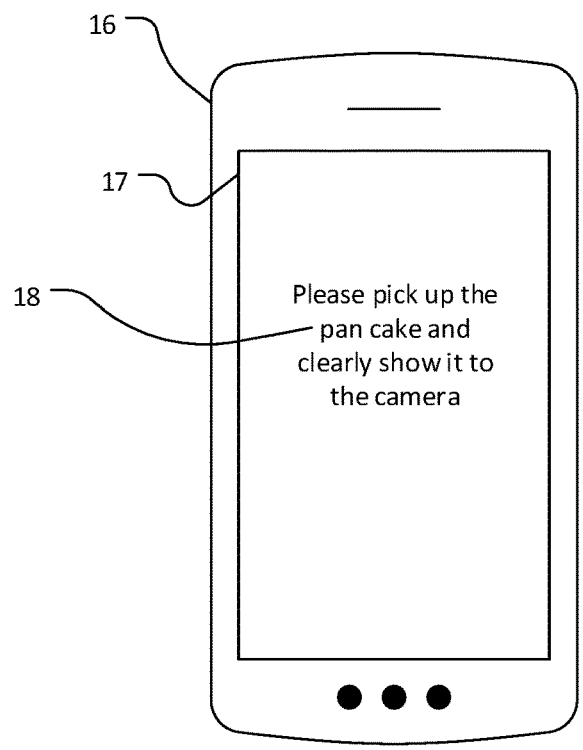
FIG. 7a shows an embodiment of a user query on a display of a mobile phone.

FIG. 7a shows an embodiment of a user query on a display of a mobile phone. The mobile phone 16 is equipped with a multispectral camera (e.g. on the back side of the dive, thus not shown in FIG. 5) that is configured to analyze multispectral image data of a meal to obtain information on the contents of the meal. The mobile phone 16 includes a display screen 17 that acts as user interface. The display screen 17 shows a query 18 to guide a user to pick up a pancake that has been identified in the meal and clearly show it to the camera. A user having read this query 18 can react by picking up a pancake and showing it to the camera. The process can then repeat determining information about the meal by analyzing measured data, now based on the changed attitude of the camera. This may reveal better information on the meal, e.g. more specific nutrition facts about the pancake that is shown to the camera may be obtained.

Figure 7B:
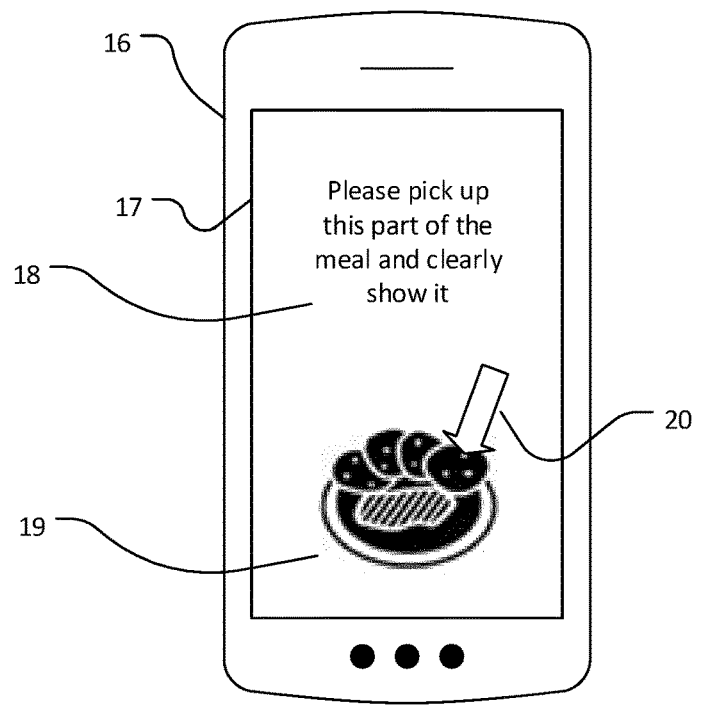
FIG. 7b shows an alternative embodiment of a user query on a display of a mobile phone.

FIG. 7b shows an alternative embodiment of a user query on a display of a mobile phone. According to this embodiment, the mobile phone 16 displays an image 19 of a meal as captured by the camera. Further, the mobile phone 16 displays a query 18 that guides a user to pick up a specific part of the meal as indicated by an arrow 20 on the image 19 and clearly show it to the camera. A user having read this query 18 can react by picking up a specific part of the meal as indicated by arrow 20. The process can then repeat determining information about the meal by analyzing measured data, now based on better image data obtained from the specific part of the meal as indicated by an arrow 20.

Figure 8:
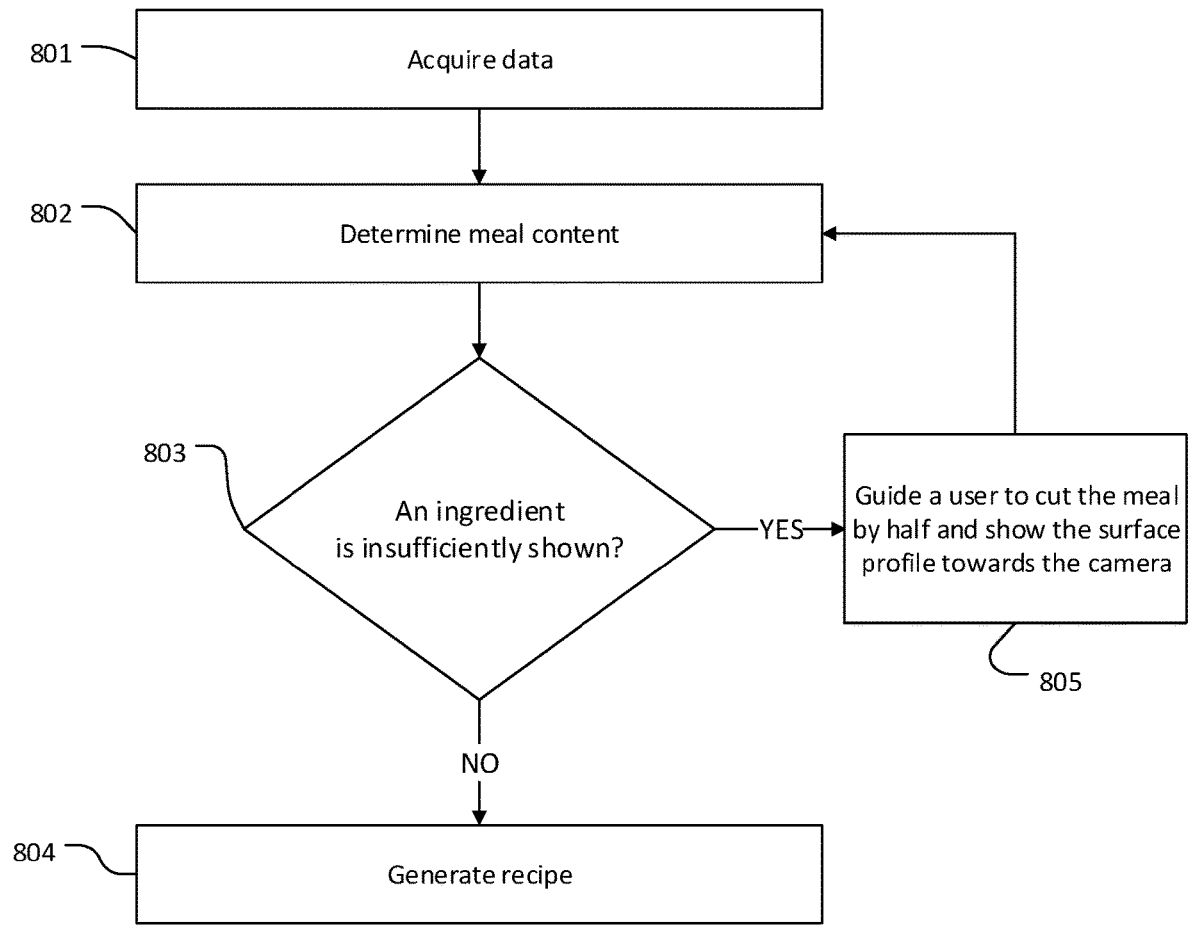
FIG. 8 shows a further specific embodiment of a recipe generation process associated with user feedback.

FIG. 8 shows a further specific embodiment of a recipe generation process associated with user feedback. At 801, data from a meal is acquired, e.g. by a multispectral camera that is integrated in a mobile phone. At 802, information about the meal, e.g. the meal content, is determined by analyzing measured data by utilizing computer vision techniques. At 803, it is determined if an ingredient is insufficiently shown (for instance, it being covered with sauce). If it is decided at 803 that all ingredients are sufficiently shown, the process continues at 804. At 804, a recipe is generated for the meal based on the determined meal content. If it is decided at 803 that an ingredient is insufficiently shown, the process continues at 805. At 805, the process generates a query to guide a user to cut the meal in half and show the surface profile towards the camera. This process may be repeated iteratively until the whole meal content has been determined. This process may be particularly helpful if there is not enough spectral information available if a meal is not cut into parts. In particular, it may allow to acquire images or data of a surface profile of the meal.

Figure 9:
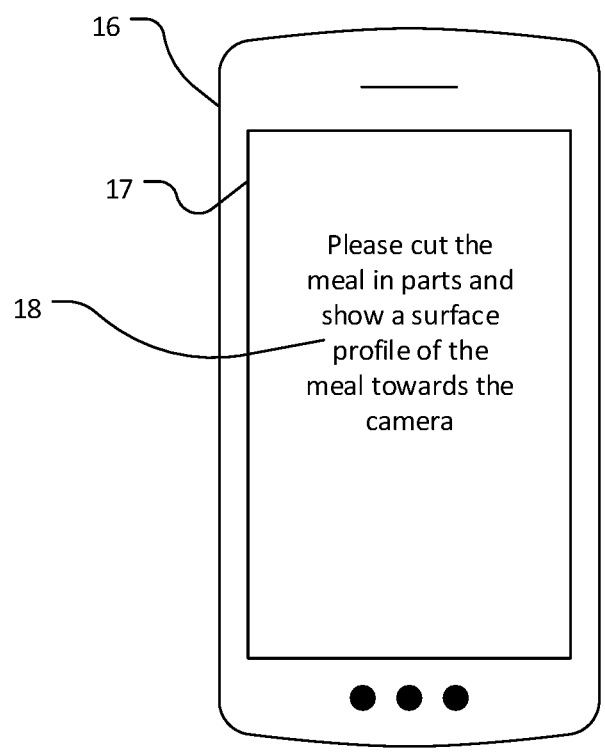
FIG. 9 shows an embodiment of a user query on a display of a mobile phone.

FIG. 9 shows an embodiment of a user query on a display of a mobile phone. The mobile phone 16 is equipped with a multispectral camera (e.g. on the back side of the dive, thus not shown in FIG. 5) that is configured to analyze multispectral image data of a meal to obtain information on the contents of the meal. The mobile phone 16 includes a display screen 17 that acts as user interface. The display screen 17 shows a query 18 to guide a user to cut the meal into parts and show a surface profile of the meal towards the camera. A user having read this query 18 can react by cutting the meal into parts and by showing a surface profile of the meal towards the camera. The process can then repeat determining information about the meal by analyzing measured data, now based on the information obtained from the surface profile of the meal. This may reveal better information on the meal, e.g. more specific nutrition facts about the meal that is cut into parts may be obtained.

Figure 10:
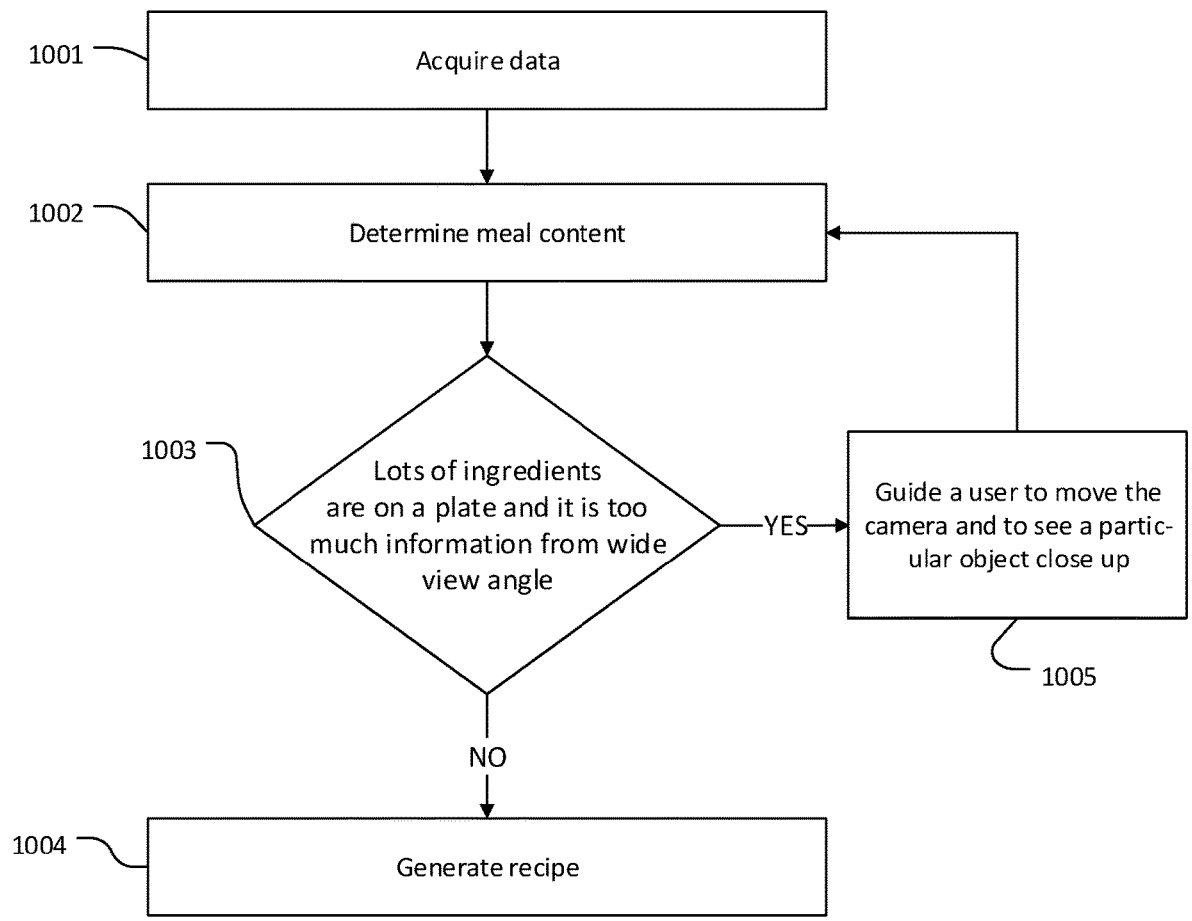
FIG. 10 shows a further specific embodiment of a recipe generation process associated with user feedback.

FIG. 10 shows a further specific embodiment of a recipe generation process associated with user feedback. At 1001, data from a meal is acquired, e.g. by a multispectral camera that is integrated in a mobile phone. At 1002, information about the meal, e.g. the meal content, is determined by analyzing measured data by utilizing computer vision techniques. At 1003, it is determined if lots of ingredients are on a plate and it is too much information from wide angle view. If it is decided at 1003 that that there are not too many ingredients on the plate, the process continues at 1004. At 1004, a recipe is generated for the meal based on the determined meal content. If it is decided at 1003 that there are too many ingredients on the plate, the process continues at 1005. At 1005, the process generates a query to guide a user to move the camera and to see a particular object close up. This process may be repeated iteratively until the whole meal content has been determined or until the identification of the meal can be performed. This process may be particularly helpful if there is not enough depth information available from a wide angle view. In particular, it may allow to execute more accurate volume analysis by excluding ambiguousness due to too much information.

It should again be noted that not necessarily the whole meal content must be determined to identify a meal. According to some embodiments, the content of a meal is identified up to a predetermined level at which an identification of the meal can be performed. If the meal can be fully identified based on only parts of its content, then a reference database may be queried to receive the remaining content of the meal that have not yet been identified, respectively the recipe for cooking the complete meal.

Figure 11:
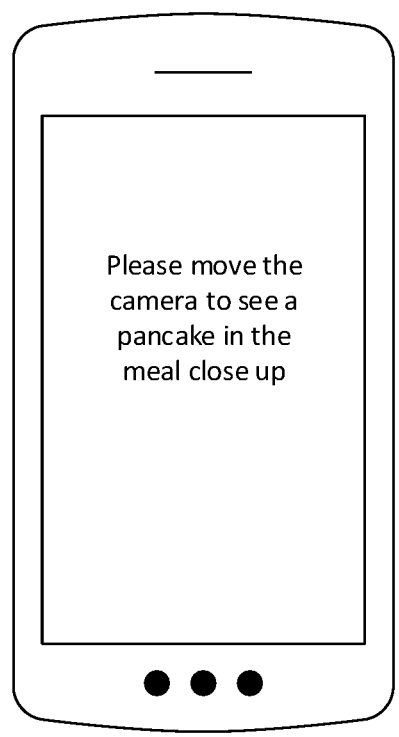
FIG. 11 shows an embodiment of a user query on a display of a mobile phone.

FIG. 11 shows an embodiment of a user query on a display of a mobile phone. The mobile phone 16 is equipped with a multispectral camera (e.g. on the back side of the dive, thus not shown in FIG. 5) that is configured to analyze multispectral image data of a meal to obtain information on the contents of the meal. The mobile phone 16 includes a display screen 17 that acts as user interface. The display screen 17 shows a query 18 to guide a user to move the camera to see a pancake in the meal close up. A user having read this query 18 can react by moving the camera to see the pancake in the meal close up. The process can then repeat determining information about the meal by analyzing measured data, now based on the information obtained from the surface profile of the meal. This may reveal better information on the pancake, e.g. more specific nutrition facts about the pancake that is examined close up may be obtained.

The processes of FIGS. 6, 8 and 10 may be combined and executed iteratively (e.g. one after another and then repeated) to analyze a meal completely. If all ingredients of a meal are identified, a recipe of the meal can be generated.

Figure 12A:
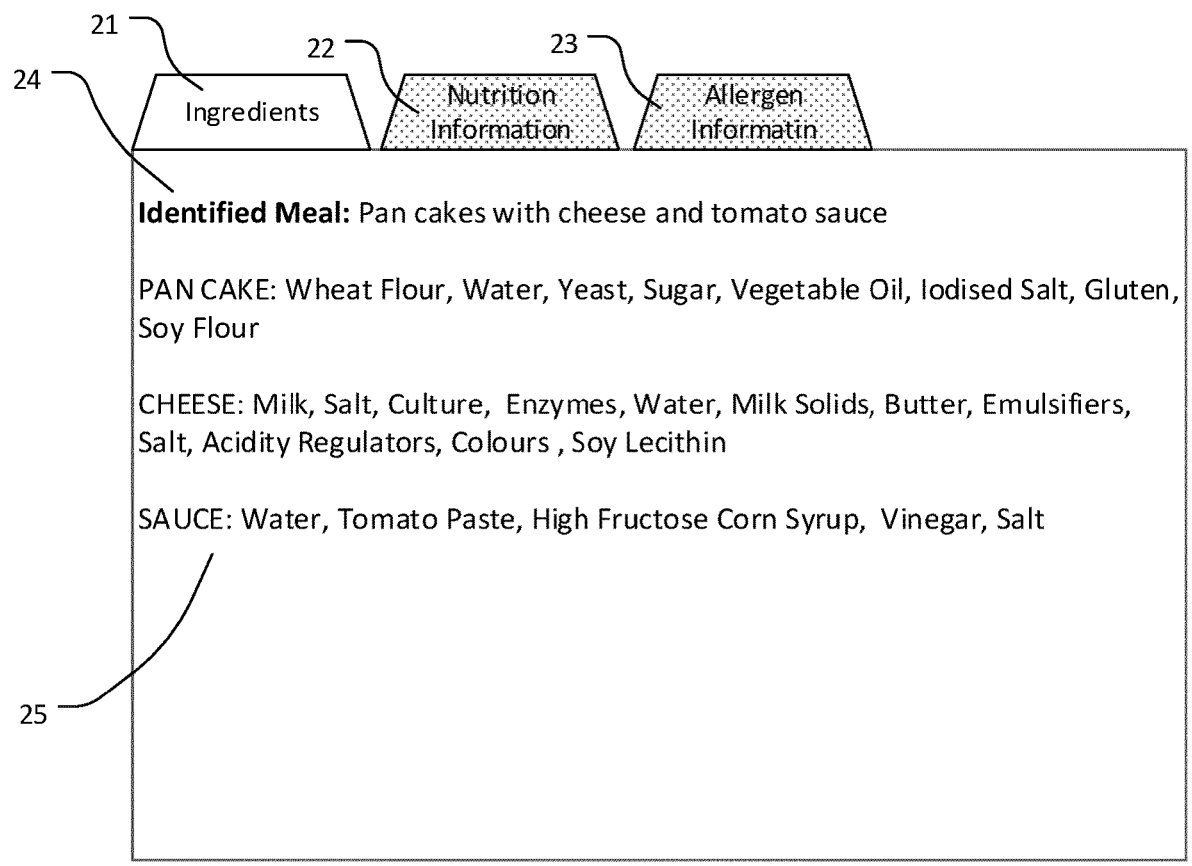
FIGS. 12a, b, c show an example of a generated recipe.

FIGS. 12a, b, c show an example of a generated recipe.

FIG. 12a shows a recipe as it may be displayed on the screen of a mobile device. The recipe includes three subsections, "Ingredients" 21, "Nutrition information" 22 and "Allergen information" 23. In FIG. 12a, the "Ingredients" section 21 is selected and displayed. At 24, the name of the identified meal is displayed, here "Pancakes with cheese and tomato sauce". At 25, the ingredients of the meal are identified. In the embodiment, a pancake with the ingredients wheat flour, water, yeast, sugar, vegetable oil, iodized salt, gluten, soy and flour has been identified. Still further, cheese with the ingredients milk, salt, culture, enzymes, water, milk solids, butter, emulsifiers, salt, acidity regulators, colors, and soy lecithin has been identified. Still further, a sauce with the ingredients water, tomato paste, high fructose corn syrup, vinegar, and salt has been identified.

Figure 12B:
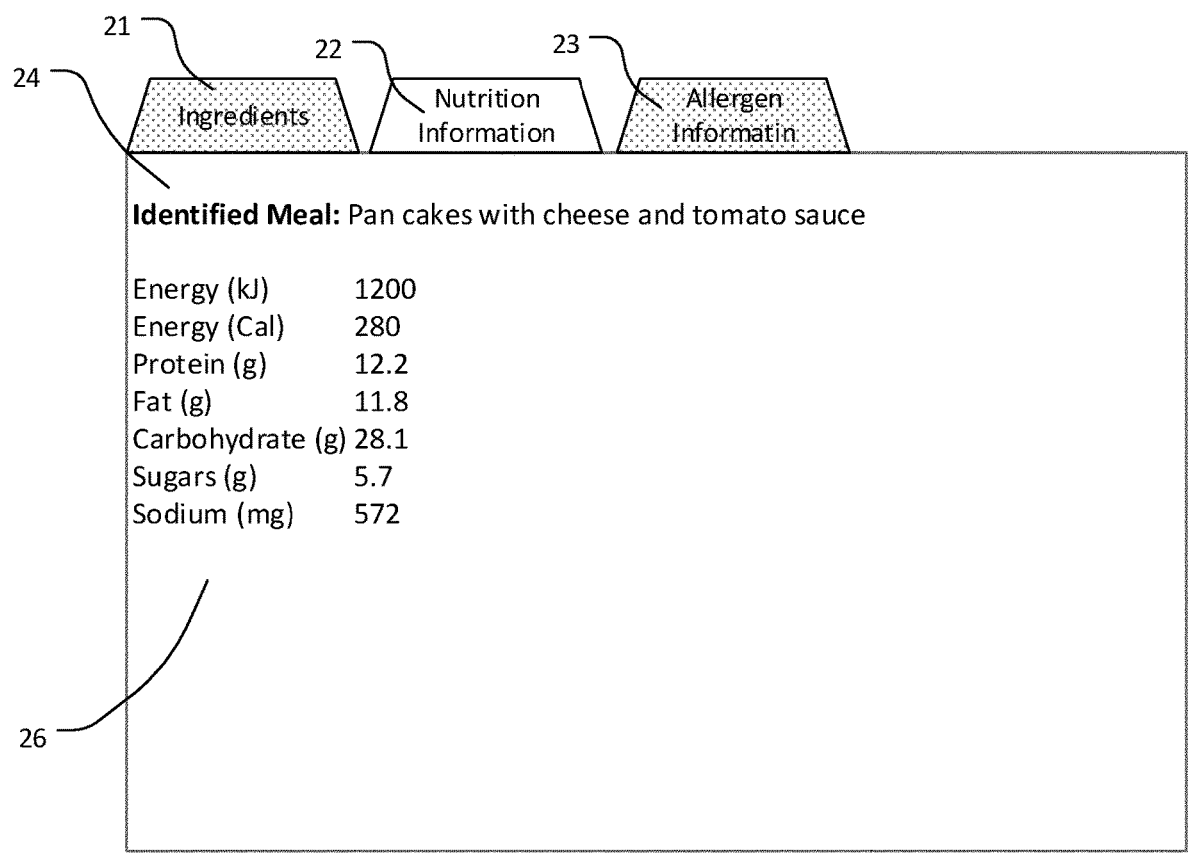

In FIG. 12b, the "Nutrition information" section 22 is selected and displayed. At 26, the nutrition information of the meal is identified. In the embodiment, the meal is identified as including 1200 kJ energy (which is 280 Cal), 12.2 g protein, 11.8 g fat, 28.1 g Carbohydrate, 5.7 g sugars and 572 mg sodium.

Figure 12C:
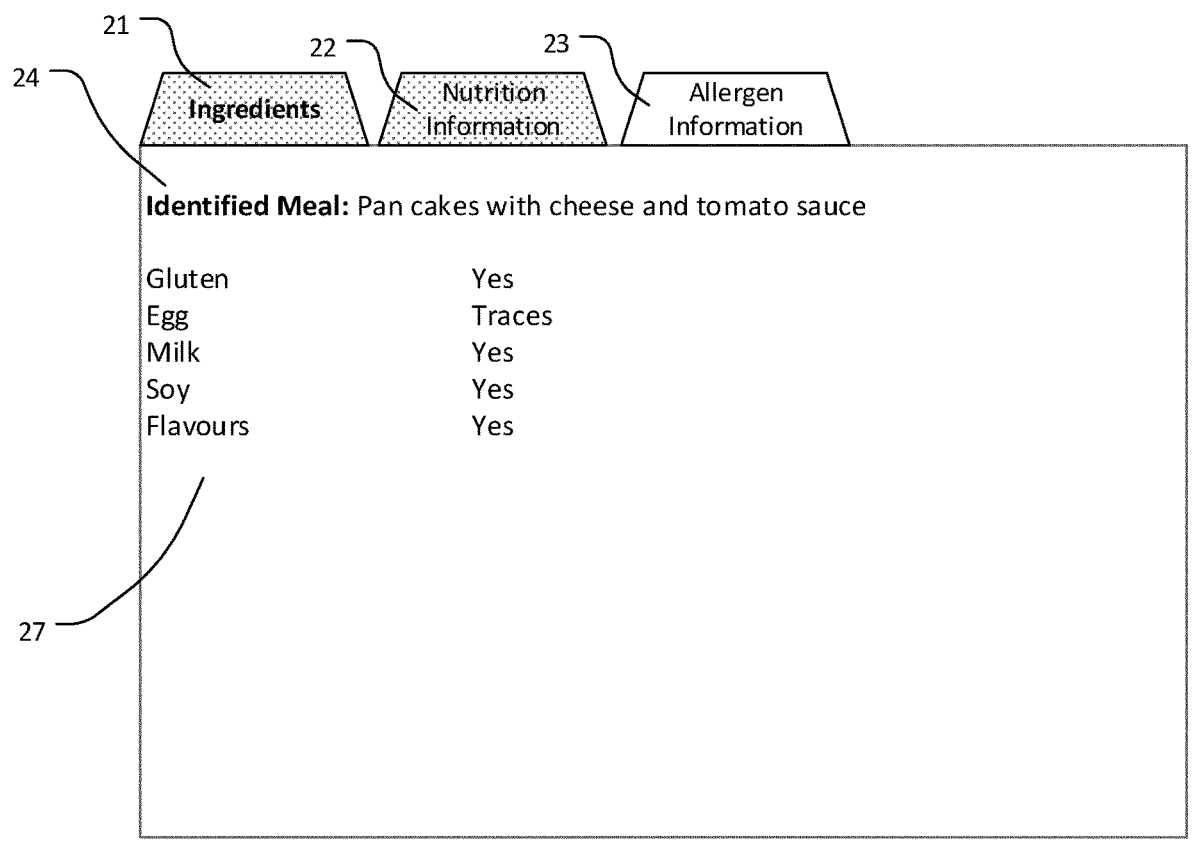

In FIG. 12c, the "Allergen Information" section 23 is selected and displayed. At 27, the allergen information of the meal is identified. In the embodiment, the meal is identified as including gluten, traces of egg, milk, soy and flavors as potential allergens.

According to still further embodiments, the recipe generation also includes determining cooking instructions that result in a meal that corresponds to the result (ingredients, nutrition information) of the above described process of computer vision. That is, based on the ingredients and nutrition information of a meal, a recipe of the meal can be obtained. Not only the meal name can be identified, but also the meal content and cooking operations can be determined. A recommendation application may recommend a recipe according to a build model of a user's typical food preferences and choices by analyzing the food intake over time, or it may provide recommendations based on a person's purchase history stored in a database, or it may recommend a recipe according to user's diet plan.

The system may for example provide a web link to a web page providing the steps of cooking.

The recipe generation can be fully automated with the help of the above-described intelligent identification system. The method can determine the way of cooking, duration of cooking, step of cooking, the volume of ingredients, the quantity of salt, sugar and oil based on measured data. The system may also calculate calories and recommend changes to the generated recipe based on the user's health or diet plan.

Figure 13:
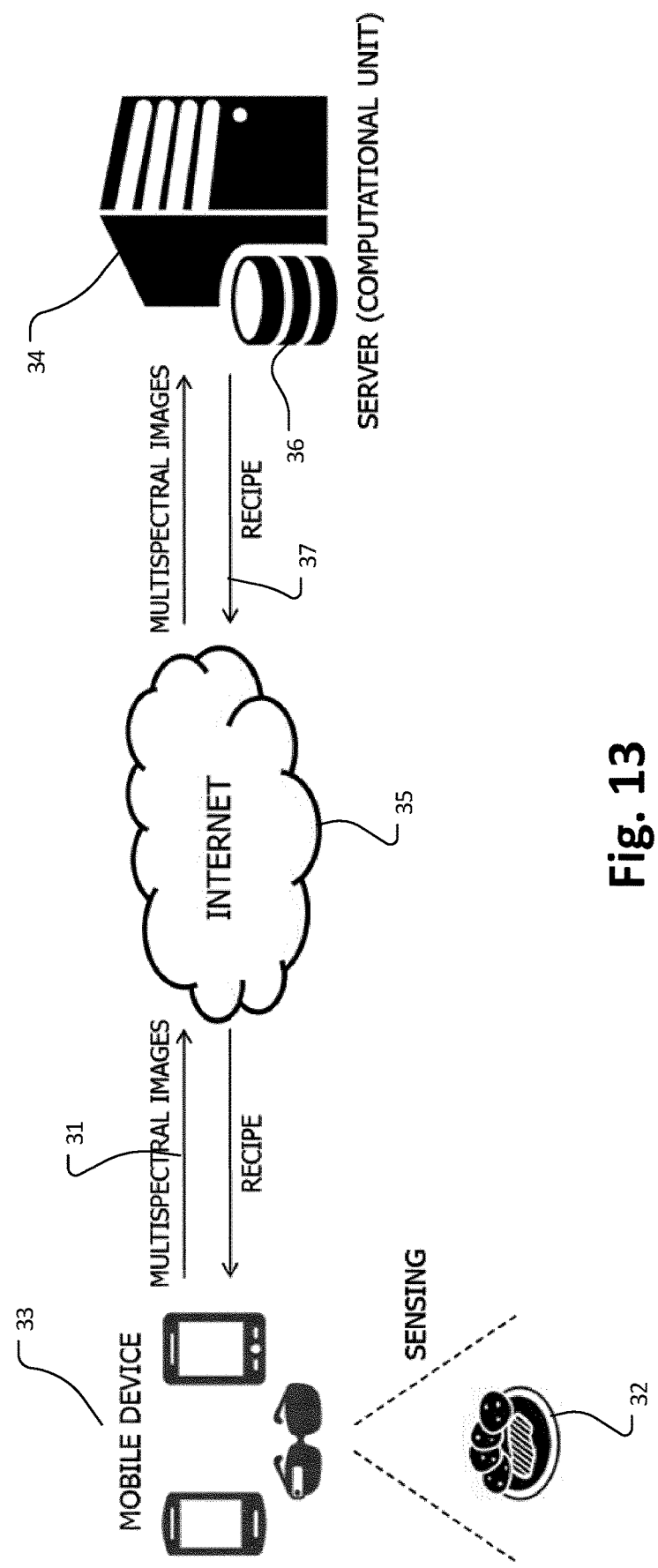
FIG. 13 schematically describes an embodiment of a system for recipe generation via Internet.

FIG. 13 schematically describes an embodiment of a system for recipe generation via Internet. The system generates recipes 37 by visual observation. Multispectral images 31 of a meal 32 are captured by a multispectral imaging device 33. The measured data 31 is transferred to computational unit 34 via Internet 35. On the computational unit 34, a recipe 37 is determined by machine learning based on multispectral images 31 referring to existing recipe databases 36. The recipe 37 can be composed of several recipe candidates shown to a user.

Figure 14:
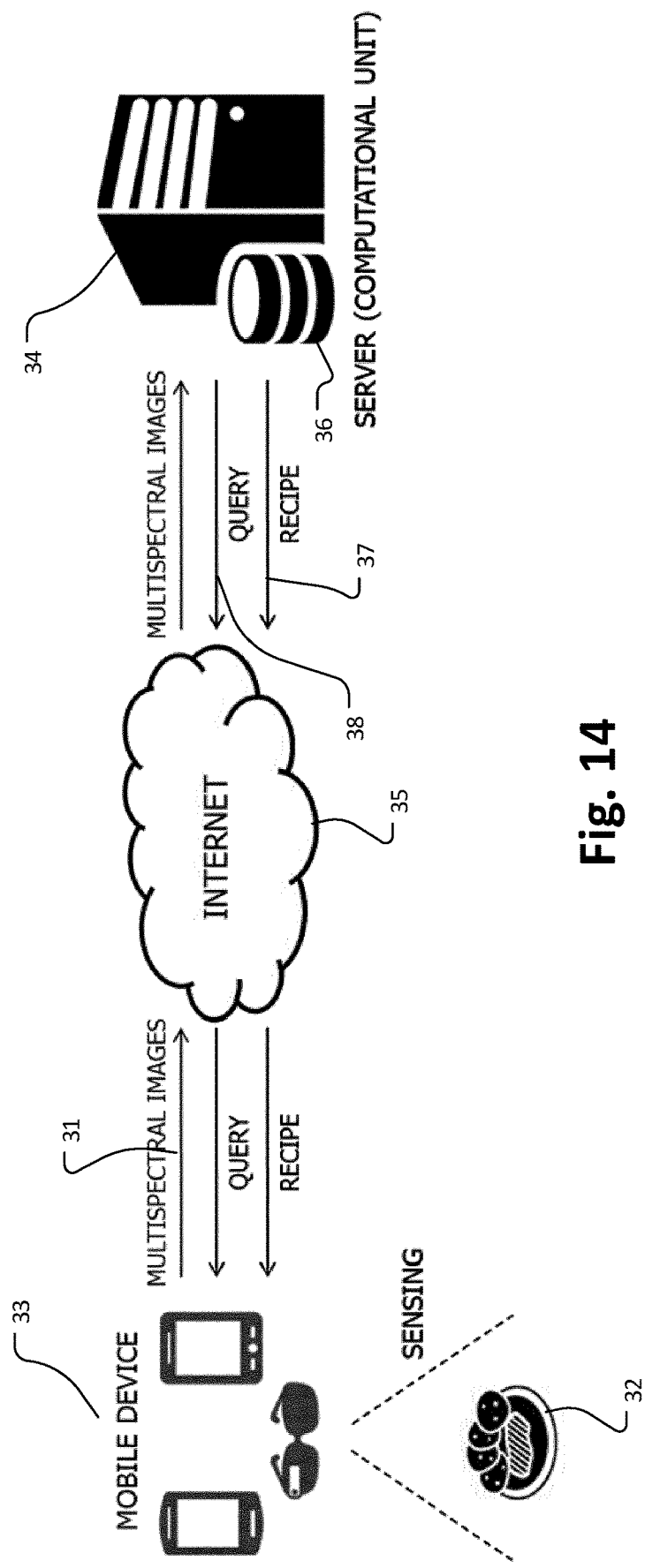
FIG. 14 schematically describes an embodiment of a system for recipe generation via Internet using feedback.

FIG. 14 schematically describes an embodiment of a system for recipe generation via Internet using feedback. The system generates a recipe 37 with interactive feedback from a user. Multispectral images 31 of a meal are captured by multispectral imaging device 33. The measured data 31 is transferred to computational unit 34 via Internet 35. At the computational unit 34, it is determined that the information is not enough to determine a recipe. Accordingly, the system sends a query 38 with some guidance for asking a user to change the capturing setting (i.e. to capture the meal differently). The query 38 can for example be an advice for changing the attitude of camera, or an advice for cutting the meal in half, or an advice for closing up particular ingredient. After enough information to identify ingredients has been acquired, the system generates a recipe 37 and sends it to a user.

Figure 15:
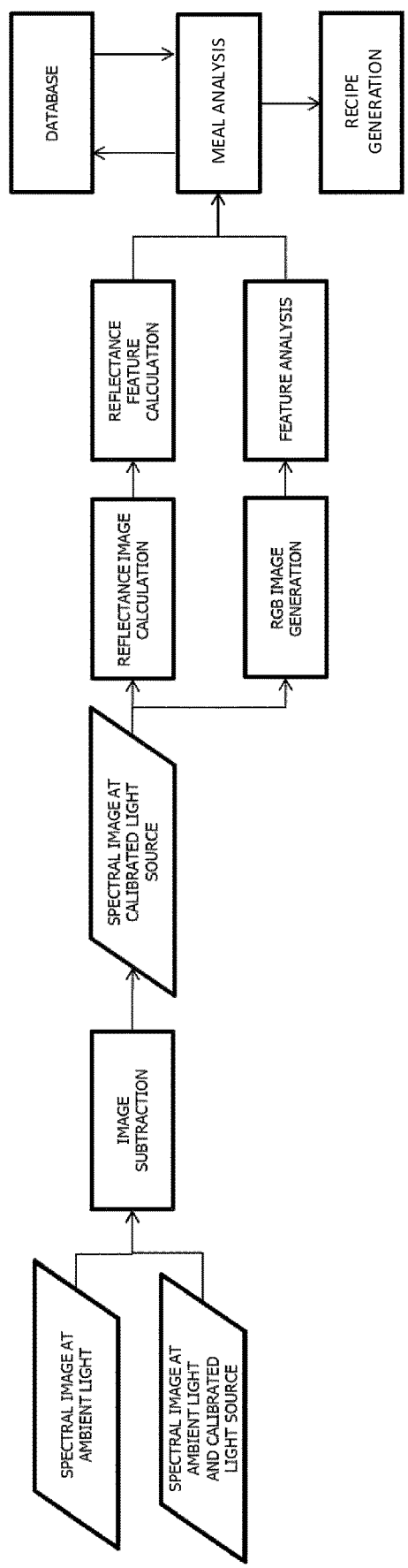
FIG. 15 shows an embodiment of a method for recipe generation using a difference spectrum.

FIG. 15 shows an embodiment of a method for recipe generation in more detail. According to this embodiment, a spectral imager (e.g. spectral sensor) and a calibrated light source is utilized. By illuminating a meal first without calibrated light source (that is, by e.g. ambient light) a spectral image 601 is taken. Afterwards, a second spectral image 602 is taken with calibrated light source. At 603, a spectral image 604 is generated by subtraction which corresponds to the condition if only light of the calibrated light source is present. From this, at 605, a reflectance image is calculated. From this reflectance image, at 606, by preprocessing steps reflectance features (like ratios or differences between different wavelengths) are derived. Simultaneously, at 607, an RGB image is derived from the spectral image 604. From this RGB image, at 608, meal parts if present are analyzed and respective features like the size of dumplings are derived. At 609, based on the combined features, reflectance and feature analysis, the meal analysis is accomplished. This process might take into account an additional database 610 containing further information about the identified or classified meals and its components. At 611, the results of the meal analysis is output as a recipe.

It should be noted that the creation of an RGB as done at 607 in the process of FIG. 6 is not necessarily required as the spectral image itself could be used directly for a feature analysis.

Figure 16:
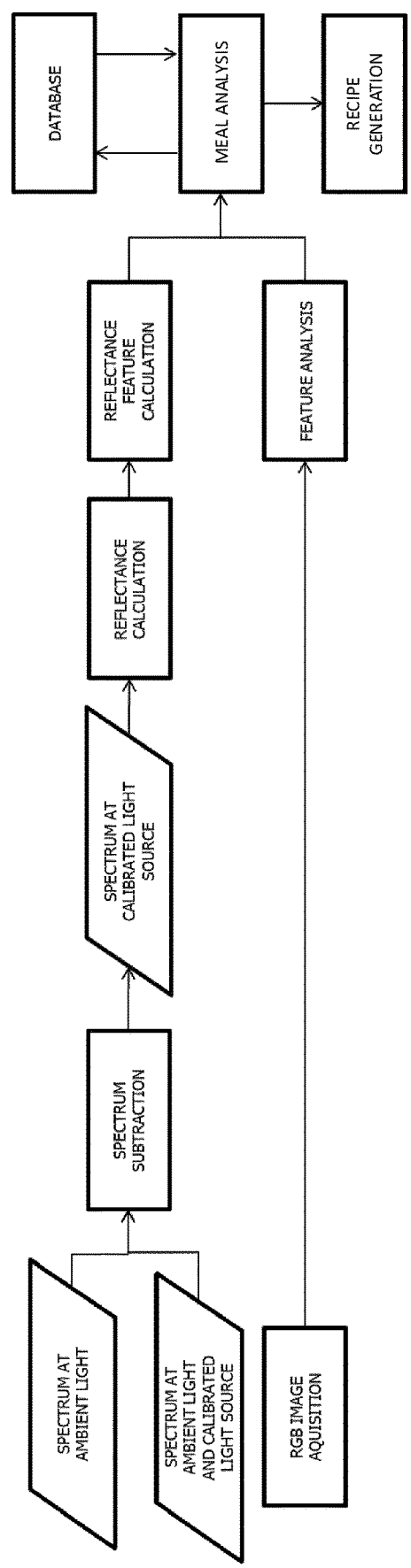
FIG. 16 shows another embodiment of a method for recipe generation using a difference spectrum.

FIG. 16 shows another embodiment of a method for recipe generation. According to this embodiment, a miniaturized spectrometer, RGB imager and a calibrated light source is utilized. By illuminating a meal first without calibrated light source a spectral image 701 is taken. Afterwards, a second spectral image 702 is taken with calibrated light source. At 703, a spectral image 704 is generated by subtraction which corresponds to the condition if only light of the calibrated light source is present. From this spectral image 704, at 705, its reflectance is obtained. From this reflectance, at 706, by preprocessing steps, reflectance features are derived. Simultaneously, at 712, an RGB image is taken with RGB imager under ambient light conditions. As in the embodiment of FIG. 15, the RGB image allows, at 713, analyzing meal parts if present and deriving respective features. Based on the combined features, reflectance and feature analysis, at 709, the meal analysis is accomplished. Again, this step might take into account an additional database 710 containing further information about identified or classified meals and its components. At 711, the results of the meal analysis are output as a recipe.

Figure 17A:
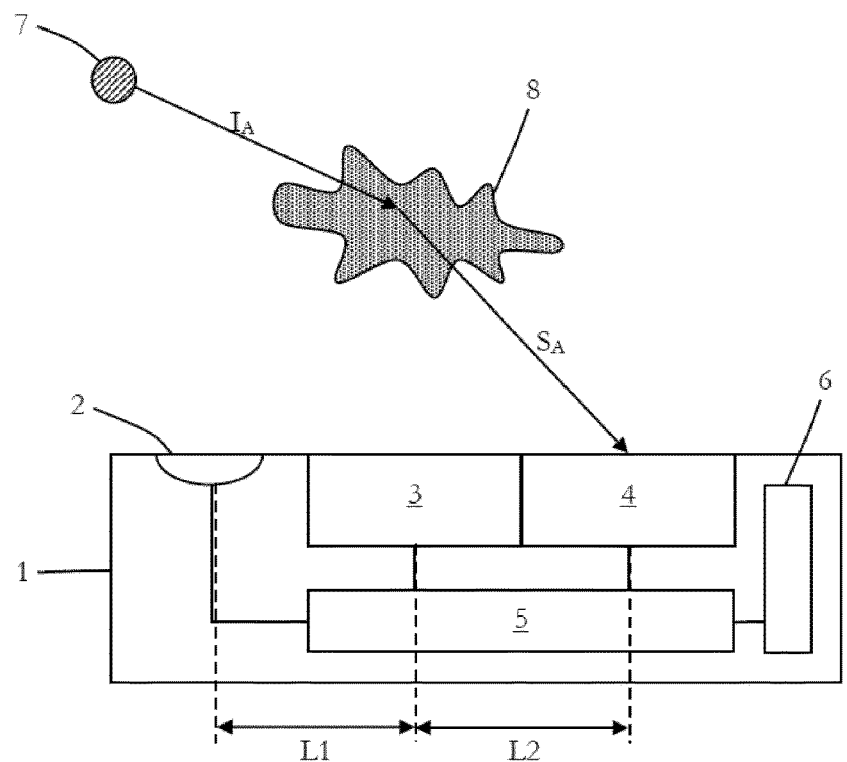
FIG. 17a illustrates a first measurement for obtaining a reflectance spectrum, wherein the light source of the mobile reflectometer is switched off.
Figure 17B:
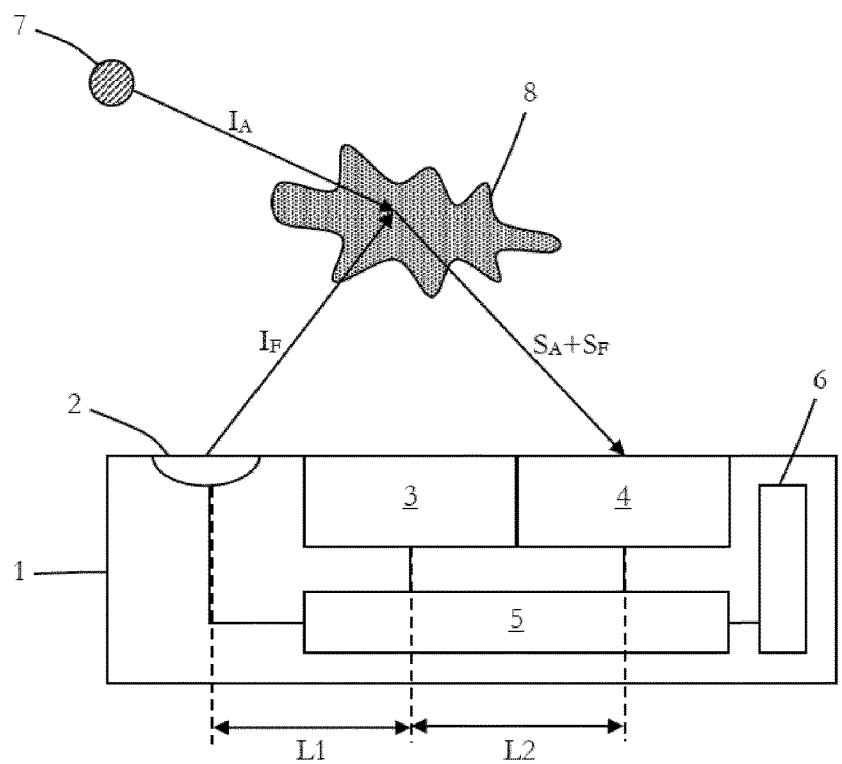

In the following, the measurement of the reflectance of a liquid according to an embodiment is described. In this embodiment, the measurement of the reflectance for the object, here a liquid, is done by performing two spectral measurements, wherein FIG. 17a illustrates a first measurement and FIG. 17b illustrates a second measurement.

A first measurement takes place (FIG. 17a), when the light source is switched off, e.g. by the processor 5, such that only light from an ambient light source 7, such as the sun or other light source, is present.

Then, the processor drives the spectral sensor 4 accordingly to collect first spectral information about light which is reflected by the object 8 in the form of a spectral image or a spectrum $S_A$ and which incidents into the spectral sensor 4. The spectrum $S_A$ can be stored in a memory, storage or the like of the reflectometer 1.

For the second measurement, the calibrated light source 2 is switched on, e.g. by the processor 5. Now, ambient light emitted from the ambient light source 7 and light from the calibrated light source 2 illuminate the object of interest. The spectral sensor 4 collects second spectral information in the form of a spectral image or a spectrum $S_{A+F}$ for the light reflected from the object 8 originating from the calibrated light source 2 and the ambient light source 7. Hence, the reflected light includes light from the ambient light source 7 and light from the calibrated light source 2.

Additionally, at the same time of the second measurement and the same time as the spectral sensor 4 is driven by the processor 5, the processor 5 also drives the depth sensor 3, which determines a distance between the depth sensor 3 and the object 8 by capturing a depth map D. It is assumed that the relative distance between object 8 and reflectometer 1 is the same in both measurements. Of course, the point of time of driving the depth sensor 3 is only exemplary, and, in principle, the depth sensor 3 can be driven at any point of time for obtaining the depth map D.

The spectra $S_A$ and $S_{A+F}$, the depth map D and other parameters may be stored by the processor 5 in a memory, storage or the like.

Figure 18:
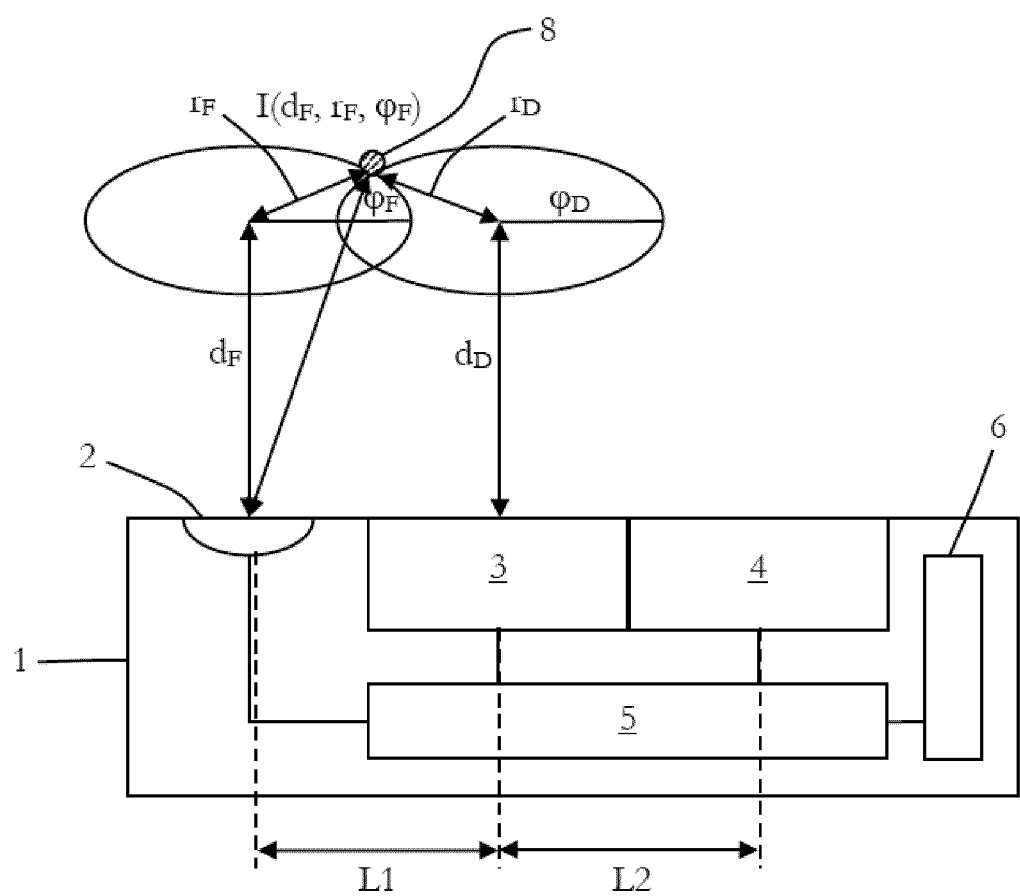
FIG. 18 illustrates a coordinate transformation.

After having performed the two measurements, the processor 5 calculates the absolute reflectance spectrum as follows and as also illustrated in FIG. 18:

First, a spectrum $S_F$ is calculated, which represents light intensities reflected from the object 8 as if only light were reflected from the object 8 originating from the light source 2. This is done by subtracting the spectrum $S_{A+F}$ obtained during the second measurement where the light source 2 was switched on and the spectrum $S_A$ obtained in the first measurement where the light source 2 was switched off from each other:

$$S_F = S_{A+F} - S_A$$

Second, the absolute power $I_F$ of the calibrated light source 2 at the position of the object 8 is calculated by the processor 5.

In the coordinate system of the depth sensor 3 the object 8 is located at $(d_D, r_D, \varphi_D)$, see also FIG. 18. This can be directly derived from the acquired depth map D which includes the information of the distance of the object 8 with respect to the depth sensor 4.

The processor 5 performs a simple coordinate transformation T, which results in the coordinates $(d_F, r_F, \varphi_F)$ in the coordinate system of the calibrated light source 2:

$$(d_F, r_F, \varphi_F)^T = T*(d_D, r_D, \varphi_D)^T$$

These coordinates $(d_F, r_F, \varphi_F)$ can be used for calculating the absolute incident power $I_F$, as introduced before:

$$I_F = I(d_F, r_F, \varphi_F).$$

Finally, the absolute reflectance R is obtained by dividing the reflected power $S_F$ with the incident power $I_F$:

$$R = S_F / I_F$$

As mentioned above, in the present embodiment the depth sensor 3 and the spectral sensor 4 are very close to each other such that the influence of the distance between them is negligible. In other embodiments, the distance between the depth sensor 3 and the spectral sensor 4 can be considered by performing another coordinate transformation, for example, into the coordinate system of the spectral sensor 4. However, then the classical parallax problems, such as occlusion, may arise.

In the present embodiment, the calculation was done for a single point of an object. In other embodiments, the depth sensor and/or the spectral sensor may be two-dimensional (2D) sensors such that also a complete 2D reflectance measure may be performed in such embodiments. Moreover, the single point measurement as done in the embodiment discussed above can also be repeated for multiple points of an object.

All units and entities described in this specification and claimed in the appended claims can, if not stated otherwise, be implemented as integrated circuit logic, for example on a chip, and functionality provided by such units and entities can, if not stated otherwise, be implemented by software.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary order of method steps. The specific order of method steps is, however, given for illustrative purposes only and should not be construed as binding.

The method can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

In so far as the embodiments of the disclosure described above are implemented, at least in part, using a software-controlled data processing system, it will be appreciated that a computer program providing such software control and a transmission, storage or other medium by which such a computer program is provided are envisaged as aspects of the present disclosure.

Note that the present technology can also be configured as described below.

(1) A system including
circuitry configured to
process multispectral image data of a meal to obtain information on the contents of the meal;
generate, based on the obtained information, a query with guidance to change image capture settings.

(2) The system of (1), wherein the circuitry is configured to generate the query with guidance according to insufficient information on the contents of the meal.

(3) The system of (1) or (2), wherein the circuitry is configured to guide a user to change a shooting angle of a camera to point to other ingredients of the meal.

(4) The system of anyone of (1) to (3), wherein the circuitry is configured to guide the user to pick up at least a part of the meal.

(5) The system of anyone of (1) to (4), wherein the circuitry is configured to guide the user to cut the meal into parts and show a surface profile of the meal towards a camera.

(6) The system of anyone of (1) to (5), wherein the circuitry is configured to guide the user to move a camera and to see a particular object in the meal close up.

(7) The system of anyone of (1) to (6), wherein the circuitry is configured to generate a recipe of the meal based on the obtained information on the contents of the meal.

(8) The system of (7), wherein the recipe includes ingredients information, nutrition information, and/or allergen information.

(9) The system of (7) or (8), wherein the circuitry is configured to change the recipe generation process based on feedback.

(10) The system of anyone of (1) to (9), further including a sensor arrangement configured to collect multispectral image data of a meal.

(11) The system of (10), wherein the sensor arrangement is configured to provide depth information.

(12) The system of (10) or (11), wherein the sensor arrangement is configured to provide mass spectrography information.

(13) The system of anyone of (10) to (12), wherein the sensor arrangement is configured to provide visible images, infrared images, and/or spectral data.

(14) The system of anyone of (1) to (13), wherein the circuitry is configured to perform ingredient segmentation on a multispectral image by distinguishing the difference of spectrum properties of ingredients.

(15) The system of anyone of (1) to (14), wherein the circuitry is configured to identify ingredients by analyzing spectrum data.

(16) The system of anyone of (1) to (15), wherein the circuitry is configured to use conventional image data for course identification.

(17) A method including
processing multispectral image data of a meal to obtain information on the contents of the meal; and
generating, based on the obtained information, a query with guidance to change image capture settings.

(18) A computer program including instructions, the instructions when executed on a processor causing the processor to perform:
processing multispectral image data of a meal to obtain information on the contents of the meal; and
generating, based on the obtained information, a query with guidance to change image capture settings.

(19) A non-transitory computer-readable medium embedded with a program, which when executed by a computer, causes the computer to perform a method including:
processing multispectral image data of a meal to obtain information on the contents of the meal; and
generating, based on the obtained information, a query with guidance to change image capture settings.

The invention claimed is:

1. A system comprising:
circuitry configured to
process multispectral image data of a meal to obtain information on the contents of the meal;
generate, based on the obtained information, a query with guidance to change image capture settings; and
guide a user to pick up at least a part of the meal.

2. The system of claim 1, wherein the circuitry is configured to generate the query with guidance according to insufficient information on the contents of the meal.

3. The system of claim 1, wherein the circuitry is configured to guide the user to change an attitude of a camera to point to other ingredients of the meal.

4. The system of claim 1, wherein the circuitry is configured to guide the user to cut the meal into parts and show a surface profile of the meal towards a camera.

5. The system of claim 1, wherein the circuitry is configured to guide the user to move a camera and to see a particular object in the meal close up.

6. The system of claim 1, wherein the circuitry is configured to generate a recipe of the meal based on the obtained information on the contents of the meal.

7. The system of claim 6, wherein the recipe includes ingredients information, nutrition information, and/or allergen information.

8. The system of claim 6, wherein the circuitry is configured to change the recipe generation process based on feedback.

9. The system of claim 1, further comprising a sensor arrangement configured to collect multispectral image data of a meal.

10. The system of claim 9, wherein the sensor arrangement is configured to provide depth information.

11. The system of claim 9, wherein the sensor arrangement is configured to provide mass spectrography information.

12. The system of claim 9 wherein the sensor arrangement is configured to provide visible images, infrared images, and/or spectral data.

13. The system of claim 1, wherein the circuitry is configured to perform ingredient segmentation on a multispectral image by distinguishing the difference of spectrum properties of ingredients.

14. The system of claim 1, wherein the circuitry is configured to identify ingredients by analyzing spectrum data.

15. The system of claim 1, wherein the circuitry is configured to use conventional image data for course identification.

16. A method comprising:
processing multispectral image data of a meal to obtain information on the contents of the meal;
generating, based on the obtained information, a query with guidance to change image capture settings; and
guiding the user to pick up at least a part of the meal.

17. A non-transitory computer-readable recording medium that stores a program which causes a computer to execute a method, the method comprising:
processing multispectral image data of a meal to obtain information on the contents of the meal;
generating, based on the obtained information, a query with guidance to change image capture settings; and
guiding the user to pick up at least a part of the meal.

\* \* \* \* \*